United States Patent
Miller et al.

(10) Patent No.: US 6,725,139 B2
(45) Date of Patent: Apr. 20, 2004

(54) STEERABLE NIGHT VISION SYSTEM

(75) Inventors: Ronald Hugh Miller, Saline, MI (US); Jeffrey Thomas Remillard, Ypsilanti, MI (US); Gary Steven Strumolo, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 93 days.

(21) Appl. No.: 10/064,802

(22) Filed: Aug. 19, 2002

(65) Prior Publication Data

US 2004/0034452 A1 Feb. 19, 2004

(51) Int. Cl.[7] .............................................. G06F 19/00
(52) U.S. Cl. .......................... 701/36; 382/104; 348/148
(58) Field of Search ....................... 701/1, 36; 348/119, 348/143, 148; 382/104

(56) References Cited

U.S. PATENT DOCUMENTS

| | | | |
|---|---|---|---|
| 4,645,320 A | | 2/1987 | Muelling et al. |
| 4,926,346 A | | 5/1990 | Yokoyama |
| 5,307,419 A | * | 4/1994 | Tsujino et al. ............... 382/153 |
| 5,660,454 A | * | 8/1997 | Mori et al. .................. 362/466 |
| 5,729,016 A | * | 3/1998 | Klapper et al. ............. 250/334 |
| 5,892,855 A | | 4/1999 | Kakinami et al. |
| 6,085,131 A | | 7/2000 | Kim |
| 6,580,373 B1 | * | 6/2003 | Ohashi ........................ 340/901 |
| 6,593,848 B1 | * | 7/2003 | Atkins, III ............... 340/425.5 |
| 2002/0118282 A1 | * | 8/2002 | Nakamura ................... 348/148 |

* cited by examiner

Primary Examiner—Gary Chin
(74) Attorney, Agent, or Firm—Frank A. MacKenzie

(57) ABSTRACT

A night vision system for a vehicle includes a vehicle directional sensor generating a vehicle directional signal when the vehicle is changing bearing. A night vision camera generates a camera signal. A camera motor directs the night vision camera. A camera motor control unit receives the vehicle directional signal from the vehicle directional sensor and responds by activating the camera motor.

19 Claims, 6 Drawing Sheets

STEERABLE NIGHT VISION SYSTEM

BACKGROUND OF THE INVENTION

The present invention relates generally to a night vision system and more particularly to a night vision system that is responsive to vehicle steering systems.

Night vision systems are utilized to allow a user to see objects at relatively low visibility light levels. Examples of night vision technologies are image enhancement and thermal imaging.

Image enhancement functions through collecting the tiny amounts of light, including the near infrared light spectrum, that are present but may be imperceptible to human eyes, and amplifying the light to a point at which the image can easily be observed.

Thermal imaging operates by capturing the far infrared light spectrum, which is emitted as heat by objects instead of simply reflected as light. Hotter objects, such as warm bodies, emit more of this light than cooler objects such as trees or buildings.

Night vision systems typically are classified as either passive or active. In known, passive, night vision systems used in automotive applications, far infrared cameras are used to image objects using the ambient infrared light emitted by the objects in the environment. Far infrared night vision systems have relatively few pixels and, accordingly, images formed using such cameras have low video resolution and a relatively narrow field of view. Known active night vision systems utilize a near-infrared (NIR) diode laser or a filtered incandescent light source. The NIR light is subsequently reflected off objects in the environment and is received by a camera. The camera generates a video signal responsive to received light.

Current night vision systems have a camera rigidly fixed in the vehicle pointing straight ahead. This arrangement works well if the vehicle remains relatively flat and steady while travelling in a straight line. However, this scenario is rarely achieved. Given that the camera is designed to focus beyond the range of the headlights, a pitch of a single degree can cause a shift of over twelve feet in the image. This can be distracting to a driver viewing a display of the imaged area on, for example, a Heads Up Display (HUD).

In addition, while on a curved road, the driver will be focusing, and the vehicle travelling, in a direction different than where the camera is pointing providing very little useful information to the driver.

The disadvantages associated with current night vision systems for automobiles have made it apparent that a new night vision system is needed. This new system should provide increased night vision information during most vehicle operating conditions including curves and hills.

SUMMARY OF THE INVENTION

In accordance with one aspect of the present invention, a night vision system for a vehicle is provided. The system includes a motion or directional sensor coupled to the vehicle and adapted to generate a vehicle directional signal when the vehicle is changing bearing (i.e. undergoing a turn, ascending or descending); a night vision camera adapted to generate a camera signal; a camera motor adapted to direct the night vision camera; and a camera motor control unit adapted to receive the vehicle directional signal from the directional sensor and respond by activating the camera motor.

In accordance with another aspect of the present invention, a night vision method for a vehicle is provided. The method includes sensing that the vehicle is changing bearing; generating a vehicle directional signal; activating a camera motor control unit adapted to direct a night vision camera in response to the vehicle directional signal; rotating the night vision camera; steadying an image from the night vision camera; and displaying the image on an image view screen.

The present invention enhances the utility of night vision systems far beyond present ranges of use by providing added night vision information during various vehicle operating conditions including turns. The aforementioned system directs the night vision camera while the vehicle is turning rather than having a constant view along the instantaneous direction of travel of the vehicle, as currently exists in the art.

Additional objects and features of the present invention will become apparent upon review of the drawings and accompanying detailed description of the preferred embodiments.

BRIEF DESCRIPTION OF DRAWINGS

For a more complete understanding of the invention, there will now be described some embodiments thereof, given by way of example, reference being made to the accompanying drawings, in which.

DETAILED DESCRIPTION

The present invention is illustrated with respect to a night vision system, particularly suited to the automotive field. However, the present invention is applicable to various other uses that may require night vision as will be understood by one skilled in the art.

Figure 1:
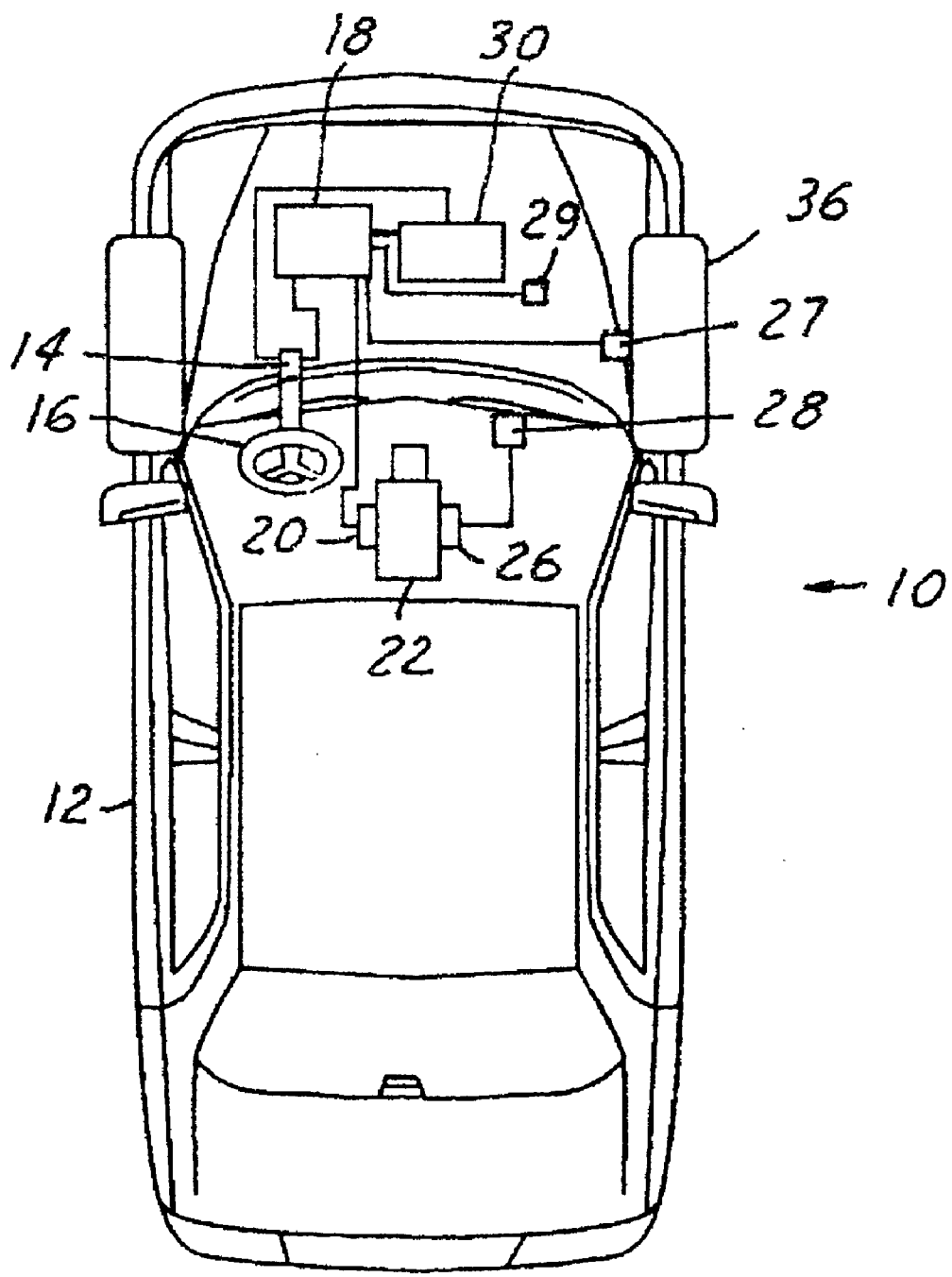
FIG. 1 is a schematic view of a vehicle night vision system according to one embodiment of the present invention.
Figure 2:
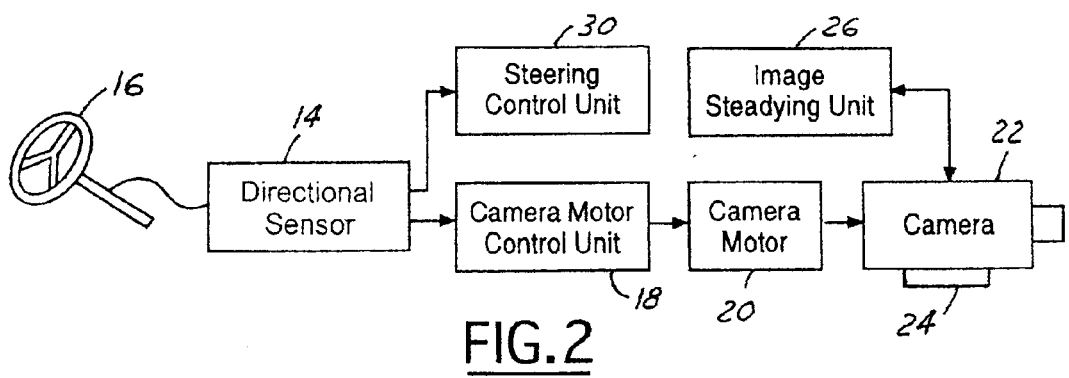
FIG. 2 is a block diagram of the vehicle night vision system according to FIG. 1.
Figure 3:
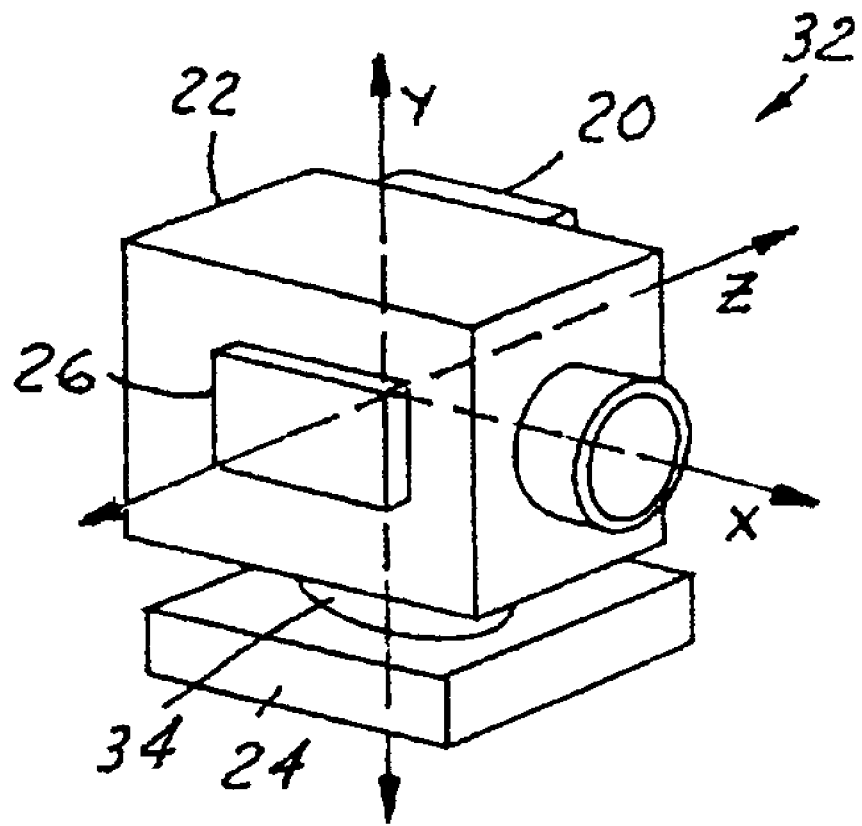
FIG. 3 is a perspective view of a night vision camera assembly for use with the vehicle night vision system of FIG. 1.

Referring to FIGS. 1, 2, and 3 a night vision system 10 for a vehicle 12, including at least one directional sensor 14, 27, or 29 coupled to the vehicle 12, in accordance with one embodiment of the present invention, is illustrated. A camera motor control unit 18 is electrically coupled to the directional sensor 14, 27 or 29 and a camera control motor 20. The camera control motor 20 is coupled to a night vision camera 22, which generates a camera signal. The night vision camera 22 is moveably coupled to a gimbal 24 and electrically coupled to an image-steadying unit 26. The image-steadying unit 26 is electrically coupled to a camera image-viewing unit 28.

Directional sensors 14, 27 and 29, which are well known in the art, generate at least one vehicle directional signal when the vehicle 22 is changing bearing, as will be discussed later. Examples of directional sensors include wheel sensors 27, pitch sensors 29, Global Positioning System (GPS) units, head mount sensors (such as incorporated in apache helicopters), steering wheel position sensors 14, and various other sensor types and combinations thereof, as will be understood by one skilled in the art.

The vehicle directional signal is embodied as, for example, a signal from the wheel sensors 27 generated when the wheels 36 are turning. An alternate vehicle directional signal is generated from a pitch sensor 29 indicating that the vehicle 12 is ascending or descending. Another embodiment includes a GPS system where satellite tracking directs the night vision camera when the vehicle 12 is undergoing, for example, a turn. Another embodiment for a directional sensor is an accelerometer. Still another embodiment includes a vehicle directional signal generated from a steering wheel position sensor 14 when the steering wheel is turning.

FIGS. 1 and 2 illustrate a vehicle 12 including a wheel sensor 27, a pitch sensor 29, and a steering wheel position sensor 14. It will be apparent to one skilled in the art that the present invention includes at least one of the aforementioned sensors or a combination thereof or alternate sensors that sense vehicle turning or vehicle pitch (i.e. vehicle is changing bearing) and generate therefrom a vehicle directional signal.

The vehicle directional signal is received in both the camera motor control unit 18 and, for the steering wheel position sensor 14, in the steering control unit 30. The steering control unit 30 typically controls steering functions such as electric power steering.

The camera motor control unit 18 is embodied as a computer containing logic adapted to receive the vehicle directional signal and respond by signaling the camera motor 20 to move the night vision camera 22. The camera motor control unit 18 responds to either the vehicle directional signal or a signal from the steering control unit 30, that signals that the vehicle 12 is undergoing a turn, ascending or descending.

Alternate embodiments include the camera motor control unit 18 as a component of the steering control unit 30. One skilled in the art will understand that the steering angle of the vehicle 12 can be obtained from any of a number of sources already incorporated in the vehicle 12.

Referring to FIG. 3, a perspective view of the night vision camera assembly 32, including x, y, and z-axis frames of reference, according to one embodiment of the present invention, is illustrated. The night vision camera 22 generates a camera signal and is coupled to a rotatable mount 34 which, in turn, is seated on a damped gimbal 24. Types of night vision sensors include thermal, CCD (charge-coupled device), or CMOS (complimentary metal-oxide semiconductor) cameras, as will be understood by one skilled in the art.

The rotatable mount 34 couples the night vision camera 22 to the vehicle 12 and provides full range of motion to the night vision camera 22.

Gimbals are a type of mount for an instrument (such as a gyroscope or compass) in which the instrument is free to rotate about two or three perpendicular axes. The gimbal 24 permits two (x and y-axis) or three (x, y and z-axis) degrees of freedom to the night vision camera 22. Alternate embodiments include any and all gimbal-type devices.

The image is further controlled using stabilization software in the image-steadying unit 26 similar to that used for handheld camcorders. The image-steadying unit 26 receives the camera signal and stabilizes it, thereby generating a stabilized signal. The camera image-viewing unit 28 (typically a video screen, HUD, liquid crystal display, etc.) receives the stabilized signal and displays it in view of the vehicle driver.

Resultantly, the driver is presented with a stable image that is pointing in the direction the vehicle 12 is heading and, more importantly, where the driver is looking, not just in the way that the front end is pointing.

Figure 4:
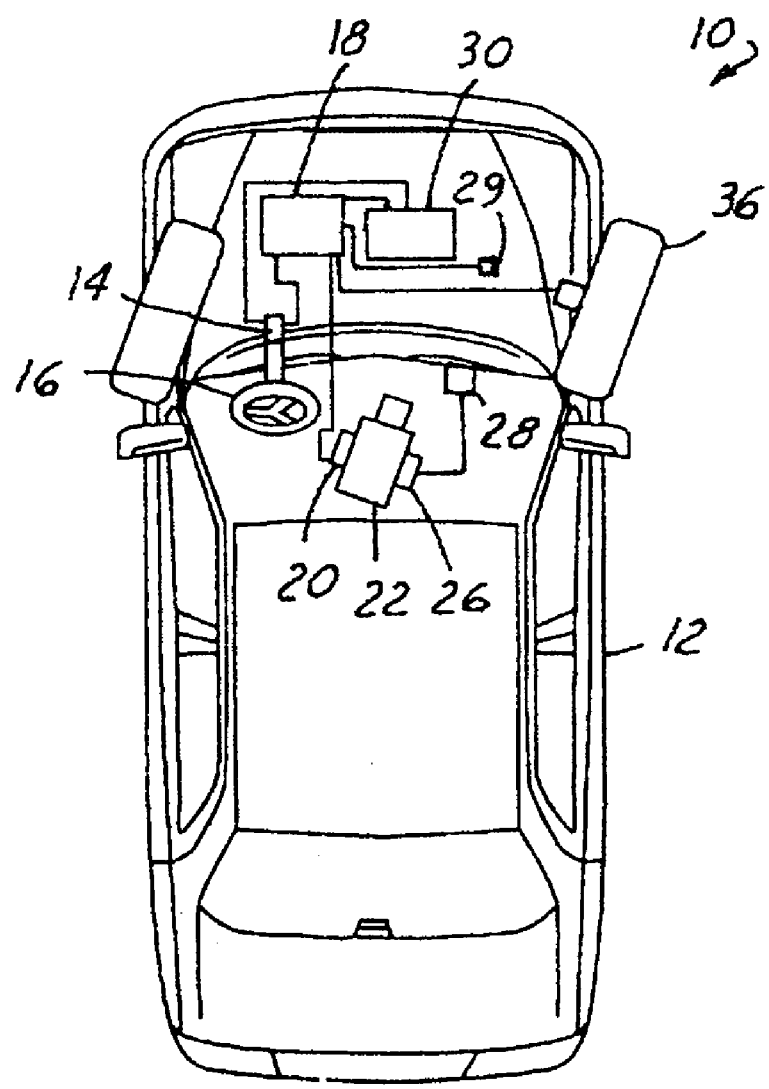
FIG. 4 is a schematic view of the vehicle night vision system of FIG. 1 undergoing a vehicle turn operation.

Referring to FIG. 4, a schematic view of the vehicle night vision system 10 of FIG. 1 undergoing a vehicle turn operation, according to one embodiment of the present invention, is illustrated. The night vision camera 22 is illustrated rotating with the tires 36 through operation of the aforementioned camera motor control unit 18.

Figure 5:
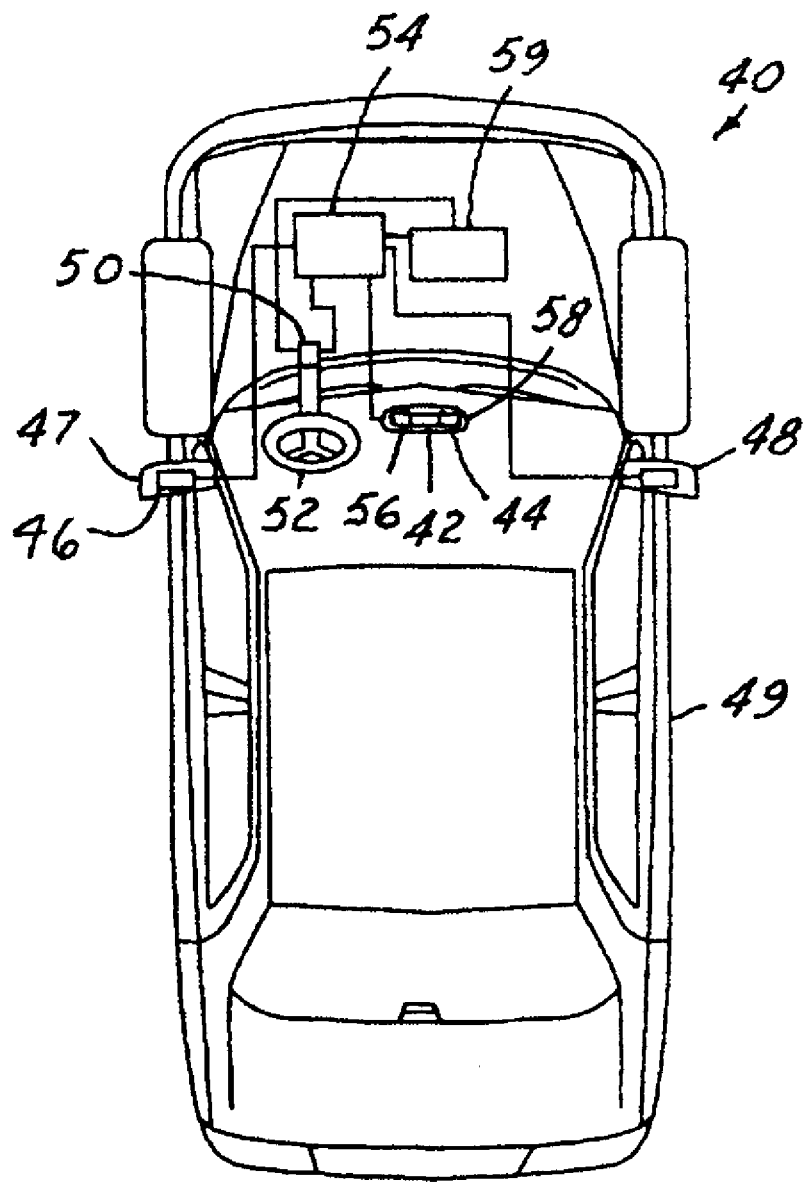
FIG. 5 is a schematic view of a vehicle night vision system according to another embodiment of the present invention.

Referring to FIG. 5, a schematic view of a vehicle night vision system 40 according to another embodiment of the present invention, is illustrated. Alternate placements of the night vision camera on the vehicle 49 are illustrated. For example, a single night vision camera 42 is shown located within a conventional vehicle rear-view mirror housing 44. Alternately, two night vision cameras 46 are located within each of the side mirrors 47, 48. The night vision camera is either pointed in the direction of vehicle travel, or alternately in the direction opposite the vehicle direction of travel and receiving the image received by each of the respective mirrors.

As in the embodiment in FIG. 1, the directional sensor, such as the steering wheel position sensor 50 senses change in position of the steering wheel 52 and therefrom generates a vehicle directional signal. The camera motor control unit 54 receives the vehicle directional signal from the steering wheel position sensor 50 and activates the camera motor 56, which directs the night vision camera or cameras 42, 46. The night vision cameras 42, 46 are coupled to gimbals and an image-steadying unit 58. The gimbal is coupled to the vehicle 49, as was previously discussed regarding FIG. 1.

Although the night vision camera or plurality of night vision cameras 42, 46 are positioned almost anywhere on the vehicle 49, however, the aforementioned locations are preferred.

Alternate embodiments include the camera motor control unit 54 electrically coupled to the steering control unit 59. One skilled in the art will understand that the steering angle of the vehicle can be obtained from any of a number of sources already incorporated in the vehicle 12.

Figure 6:
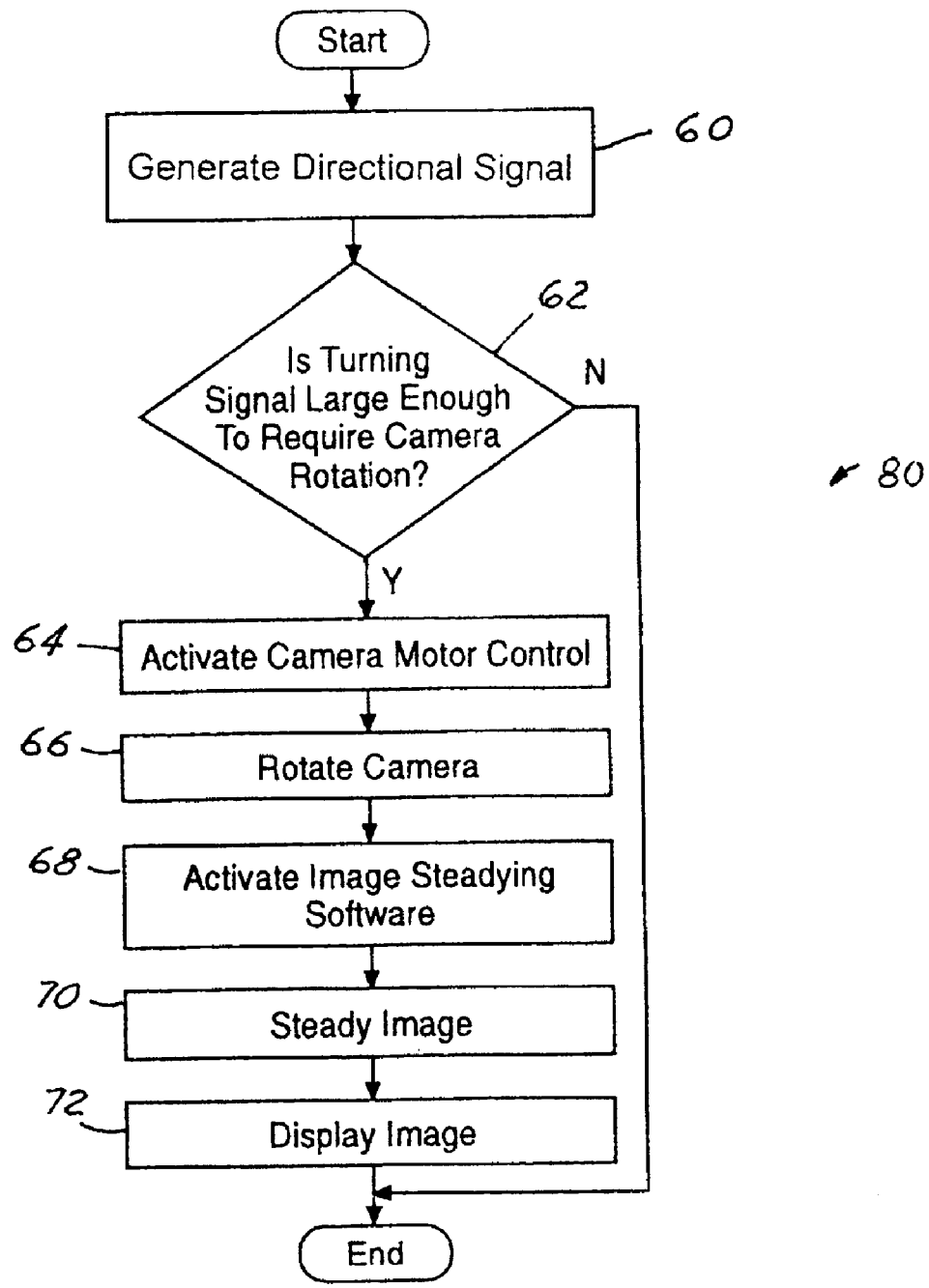
FIG. 6 is a block diagram of a vehicle night vision method according to an embodiment of the present invention.

Referring to FIG. 6, a block diagram 80 of a method for vehicle night vision according to one embodiment of the present invention is illustrated. Logic starts in operation block 60 where either the yaw or pitch of the vehicle is undergoing a noticeable change and a vehicle directional signal is generated. A check is then made in inquiry block 62 whether the vehicle directional signal is large enough to require camera movement. For a negative response, logic ends. This check is optional, however, in cases that just involve changing lanes, for example, the night vision camera field of view is still directed in the direction of travel.

Otherwise, operation block 64 activates, and the camera motor control unit is activated. In response thereto, operation block 66 activates and the camera motor control unit directs the night vision camera. Operation block 68 activates and steadying software is activated to steady the image for display, which subsequently occurs in operation block 72.

In operation, the vehicle is traveling down a road and the driver initiates a turn or navigates a hill. This generates a vehicle directional signal that activates the camera motor control, which directs the night vision camera. The image from the night vision camera is steadied both by a gimbal, which the night vision camera sits upon, and an image steadying unit, which contains image steadying software. The image is displayed on an image view screen, and shows a relatively continuous transition from one direction of vehicle travel, through a turn, and to another direction of vehicle travel.

While the invention has been described in connection with one or more embodiments, it should be understood that the invention is not limited to those embodiments. On the contrary, the invention covers all alternatives, modifications, and equivalents, as may be included within the spirit and scope of the appended claims.

What is claimed is:

1. A night vision system for a vehicle comprising:
   a vehicle directional sensor coupled to the vehicle and adapted to generate a vehicle directional signal when the vehicle is changing bearing;
   a night vision camera adapted to generate a camera signal;
   a camera motor adapted to direct said night vision camera; and
   a camera motor control unit adapted to receive said vehicle directional signal from said vehicle directional sensor and respond by activating said camera motor in response thereto.

2. The system of claim 1 wherein said vehicle directional sensor comprises a steering wheel position sensor.

3. The system of claim 1 wherein said vehicle directional sensor comprises at least one of a pitch sensor, a Global Positioning System unit, a wheel sensor, an accelerometer.

4. The system of claim 1 further comprising a gimbal coupled to said night vision camera and further coupled to the vehicle such that said gimbal limits range of motion of said night vision camera.

5. The system of claim 1 further comprising an image-steadying unit adapted to receive and stabilize said camera signal.

6. The system of claim 1 further comprising a camera image-viewing unit adapted to receive and display said camera signal.

7. The system of claims 1 further comprising a steering control unit coupled to the vehicle.

8. The system of claim 7 wherein said vehicle directional signal is received in both said steering control unit and said camera motor control unit.

9. The system of claim 7 wherein said steering control unit comprises said camera motor control unit.

10. A night vision method for a vehicle comprising:
    sensing that the vehicle is changing bearing;
    generating a vehicle directional signal;
    activating a camera motor control unit adapted to direct a night vision camera in response to said vehicle directional signal;
    shifting area of view of said night vision camera;
    generating an image from said night vision camera corresponding to night vision camera area of view; and
    displaying said image on an image view screen.

11. The method of claim 10 wherein said sensing further comprises sensing change in a vehicle pitch.

12. The method of claim 10 wherein said sensing further comprises sensing change in a vehicle yaw.

13. The method of claim 10 wherein said sensing further comprises sensing a rotation in a steering wheel.

14. The method of claim 10 further comprising steadying said image from said night vision camera.

15. The method of claim 14 wherein said steadying further comprises steadying said image with a gimbal.

16. The method of claim 14 wherein said steadying further comprises steadying said image with an image steadying unit.

17. A night vision system for a vehicle comprising:
    a vehicle directional sensor coupled to the vehicle and adapted to generate a vehicle directional signal when the vehicle is undergoing a turn;
    a night vision camera adapted to generate a camera signal;
    a gimbal coupled to said night vision camera and further coupled to the vehicle;
    a camera motor adapted to direct said night vision camera;
    an image steadying unit adapted to receive said camera signal and stabilize it, thereby generating a stabilized signal;
    a camera image viewing unit adapted to receive and display said stabilized signal; and
    a camera motor control unit adapted to receive said vehicle directional signal from said vehicle directional sensor and respond by activating said camera motor.

18. The system of claim 17 wherein said vehicle directional sensor comprises a steering wheel position sensor.

19. The system of claim 17 wherein said vehicle directional sensor comprises at least one of a pitch sensor, a Global Positioning System unit, a wheel sensor, an accelerometer.

* * * * *